United States Patent
Asperger

[11] 4,031,405
[45] June 21, 1977

[54] WINDMILL WITH SHROUD ADJUSTING MEANS

[76] Inventor: Paul Asperger, 4225 Cheryl Drive, Flint, Mich. 48506

[22] Filed: Aug. 4, 1975

[21] Appl. No.: 601,464

[52] U.S. Cl. .................................. 290/55; 290/44; 415/2

[51] Int. Cl.² .......................................... F03D 9/02

[58] Field of Search .............. 290/44, 55; 415/2–4; 417/35, 334

[56] References Cited
UNITED STATES PATENTS

| | | | |
|---|---|---|---|
| 767,080 | 8/1904 | Phillips | 415/2 |
| 1,460,114 | 6/1923 | Shelton | 415/4 |
| 2,539,862 | 1/1951 | Rushing | 290/44 |

Primary Examiner—Gerald P. Tolin
Attorney, Agent, or Firm—Gifford, Chandler, Sheridan & Sprinkle

[57] ABSTRACT

A windmill having a shroud rotatably mounted with respect to a horizontally rotatable vane assembly of the windmill and a directional vane mounted to the shroud to automatically position the shroud to expose half of the windmill vane assembly to the wind. The directional vane is adjustably mounted to the shroud so that the directional vane can be positioned with respect to the shroud to provide a range of positions of the shroud from a position in which the effect of the wind is at a maximum to a position at which it has no effect at all.

6 Claims, 5 Drawing Figures

WINDMILL WITH SHROUD ADJUSTING MEANS

BACKGROUND OF THE INVENTION

I. Field of the Invention

The present invention relates to the production of energy and more particularly to a windmill for such use and having means for regulating the effect of the wind on the vane assembly of the windmill.

II Description of the Prior Art

Windmills have, of course, been utilized for a great many years as a source of energy including electrical energy.

Such windmills have commonly included vanes or blades rotatable about a horizontal axis and means for moving the blade assembly into the direction of the wind to maximize the effect of the wind.

The prior art has also included windmills having turbine wheel type vane assemblies which rotate on a vertical axis. These types of windmills operate most effectively when a shroud is included to cover one half of the vane assembly so that the substantially horizontally directed wind does not oppose rotation of the assembly on the portion opposite that portion which is being acted upon by the wind to rotate the vane assembly.

Such windmills have not, however, included means to selectively position the shroud to thereby vary the effect of the wind on the vane assembly to thus vary the energy output of the windmill.

SUMMARY OF THE PRESENT INVENTION

The present invention is directed to a windmill of the type including a vane assembly rotatable about a vertical axis. A shroud is provided to cover approximately one half of the vane assembly and includes a directional vane which automatically positions the shroud maximize the effect of the wind.

The directional vane is rotatable with respect to the shroud and is movable between selected stop points to produce a range of adjustment for the shroud between a position in which the effect of the wind is at a maximum and a position in which the wind has no effect whatsoever on the vane assembly. Thus it is possible to vary the energy output from the windmill regardless of the direction and intensity of the wind. If the wind is so strong as to cause possible damage to the vane assembly the directional vane can be so positioned with respect to the shroud that it will move the shroud directly into the path of the wind thus protecting the vane assembly and stopping operation of the windmill.

In the preferred embodiment, the shaft of the vane assembly is preferably connected through a bevel gear assembly to several electrical generators. Although it will become apparent as the description of the invention proceeds that the energy produced by the windmill could be used to do work other than producing electrical energy.

DESCRIPTION OF THE DRAWINGS

A better understanding of the present invention will be achieved upon reference to the following description which refers to the enclosed drawing wherein like reference numerals refer to like elements, through the several views and wherein.

DESCRIPTION OF A PREFERRED EMBODIMENT

Figure 1:
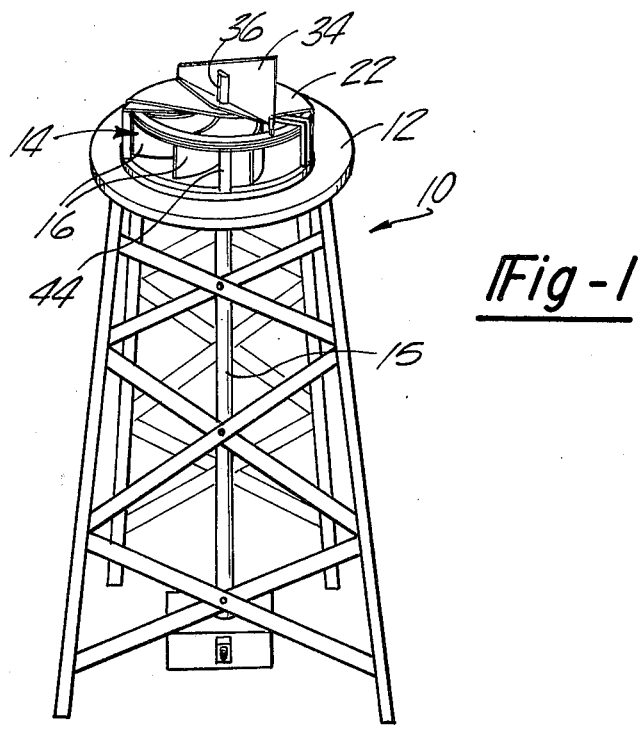
FIG. 1 is a perspective view of a windmill of the present invention.
Figure 2:
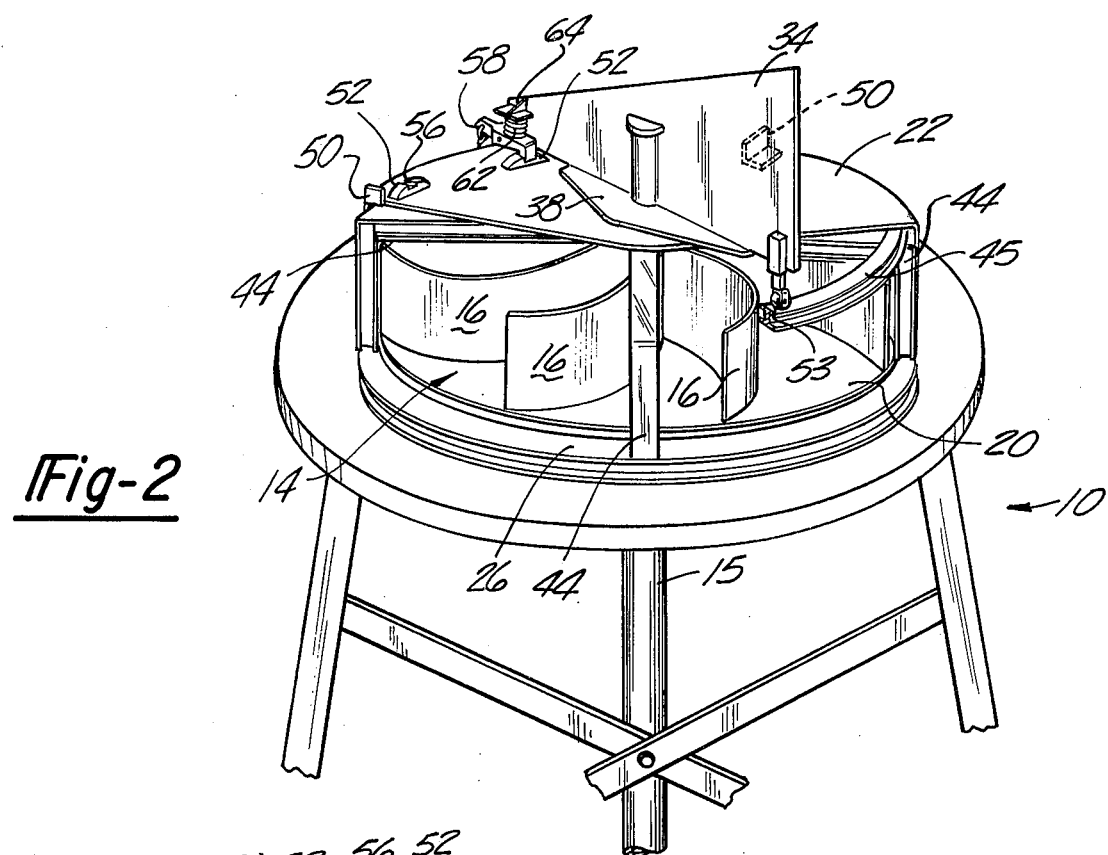
FIG. 2 is a fragmentary perspective view of a portion of the structure shown in FIG. 1 and enlarged somewhat for clarity.

Referring to FIGS. 1 and 2, a tower structure 10 is illustrated as including a platform 12 at its upper end. A vane assembly 14 is supported on the platform 12 and is mounted to a shaft 15 (FIG. 5) so that it is rotatable about a substantially vertical axis.

While it has been preferred to describe the present invention as being mounted to a tower structure 10 it should be understood that the vane assembly 14 would not have to be mounted to the platform 12 of the tower structure 10. The vane assembly 14 could instead be mounted on the ground, on the side of a mountain for instance or it could be mounted to a suitable structure in the ocean body of water.

Figure 3:
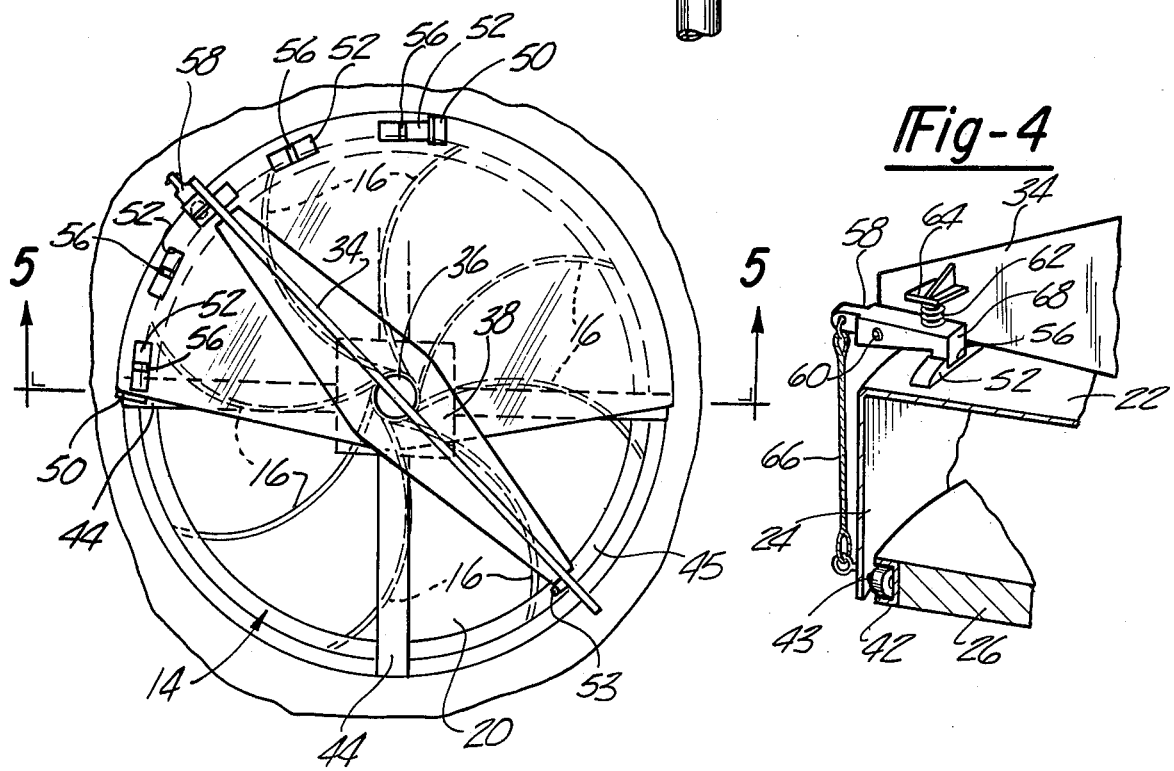
FIG. 3 is a top plan view of the windmill shown in FIG. 1.

The vane assembly as can best be seen in FIGS. 2 and 3 preferably comprises a plurality of substantially radially extending vanes 16 having a hub flange 18. As can best be seen in FIG. 5, the hub flange 18 is bolted or otherwise mounted to the shaft 15 so that rotation of the vanes 16 produces rotation of the shaft 15. A circular base member 20 is mounted to the hub 18 and the lower edges of the vanes 16 are secured to the base member 20.

Figure 5:
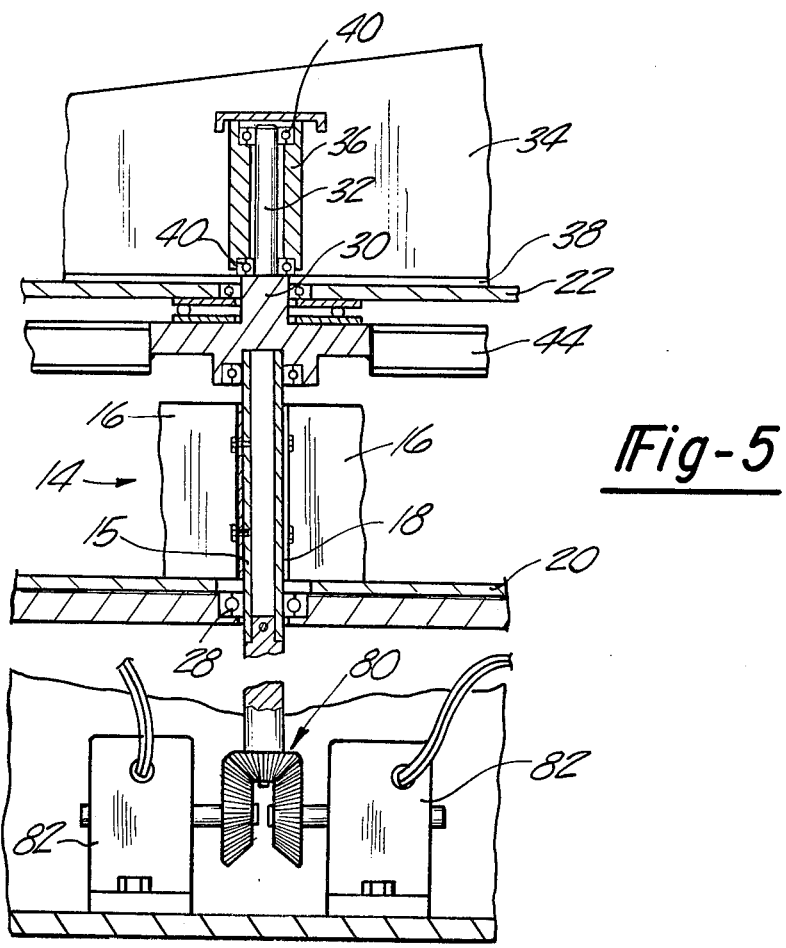
FIG. 5 is a transverse cross-sectional view of the assembly shown in FIG. 1.

An arcuate shroud 22 having a circumferential wall 24 (FIG. 4) extending toward circular base plate 26 covers substantially half of the vane assembly 14 and is rotatably mounted to the shaft 15 by bearings 28 (FIG. 5). As can best be seen in FIG. 5, a boss portion 30 is fixed to a cross piece 44 and has a shaft 32 extending upwardly therefrom. The shroud 22 is freely rotatable with respect to the boss 30.

A directional vane 34 is mounted to a hub 36 rotatably disposed about the shaft portion 32 and a base plate 38. Bearings 40 (FIG. 5) rotatably support the directional vane 34 with respect to the fixed shaft portion 32 so that the shroud 22 and the directional vane 34 rotate together independently of the vane assembly 14.

Figure 4:
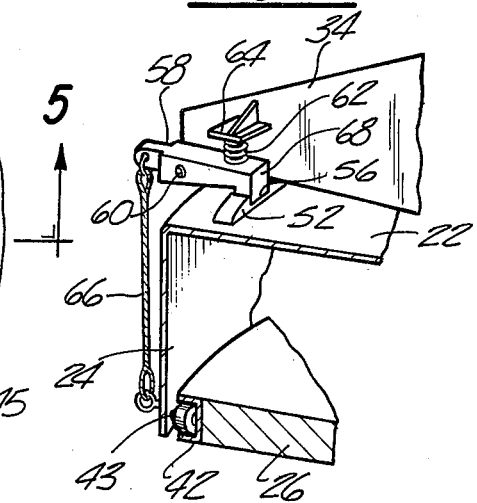
FIG. 4 is a fragmentary perspective view of a portion of the structure shown in FIGS. 1 and 2 enlarged and with portions in cross-sectional for purposes of clarity.

As can best be seen in FIG. 4 the base plate 26 is provided with a circumferential track 42 which receives rollers 43 mounted on the lower edge of the wall 24 to help support the shroud 22 for rotation with respect to the base plate 26 and the vane assembly 14. A plurality of cross pieces 44 extend upwardly from the base plate 26 and across the vane assembly 14 to help support the shroud 22 and a circular track 45 is disposed between the top of the vane assembly 14 and the shroud 22.

As can best be seen in FIGS. 2 and 3 the upper surface of the shroud 22 is provided with a pair of upstanding stops 50 disposed adjacent the periphery of the shroud 22 with one of them positioned adjacent one end of the shroud 22 and the other spaced approximately 90° from the first. The stops 50 extend sufficiently high to prevent the directional vane 34 from rotating past so that rotation of the directional vane 34 is confined to the area between the stops 50. A wheel member 53 (FIG. 2) is attached to the rear of the directional vane 34 and rides on the circular track 45 to facilitate rotation of the directional vane 34.

A plurality of stop elements 52 are disposed in substantially equally spaced relationship between the stops 50. The stop elements 52 are not as high as the stops 50 and the lower edge of the directional vane 34 is spaced sufficiently from the shroud 22 to permit the directional vane to rotate past the stop elements 52.

Each of the stop elements 52 is provided with a central radially extending channel 56. A clamp member 58 is pivotally mounted to the front of the directional vane 34 by a pin 60 (FIG. 4). A spring 62 having one end baised against a flange 64 provided on the directional vane 34 has the other end engaging the clamp member 58 to urge it downwardly toward the shroud 22.

A rope 66 or similar means at the opposite end of the clamp member 58 extends down and permits the end of the clamp member 58 to which it is attached to be pulled downwardly to pivot the clamp member 58 against the force of the spring 62. The clamp member 58 includes a portion 68 adapted to engage in the channels 56 of the stop elements 52. Thus pulling the rope 66 downwardly moves the portion 68 of the clamp member 58 upwardly away from the stop elements 52 and permits the directional vane 34 to rotate with respect to the shroud 22.

While it has been preferred to describe manual means for actuating the clamp member 58, it should be understood that other means, such as electrically actuated devices could be utilized to move the clamp members 58 as well.

The shaft 15 extends downwardly through the platform 12 and the tower structure 10 and as can best be seen in FIG. 5 is drivingly connected by a bevel gear assembly 80 to a pair of generators 82.

The present invention operates as follows: with the clamp member 58 positioned in locking engagement with the lowermost stop element 52 as viewed in FIG. 3 and with the wind in the direction of the arrow, maximum efficiency from the windmill will be achieved. This is because the directional vane 34 will seek a position in which the front of the vane is pointing in the direction of the wind. The directional vane 34 by reason of the connection afforded by the clamp 58 and the stop element 52 will cause the shroud 22 to rotate to a position exposing a maximum portion of the vane assembly 14 to the force of the wind.

If it is desired to rotate the shroud 22 to a position blocking the wind from the vane assembly 14 the clamp member 58 is disengaged from the stop element 52 by the rope 66 and the directional vane 34 is pulled by the rope 66 to a position in which the clamp member 58 can engage the stop element 52 at the opposite end. Once the directional vane 34 is clamped to the shroud 22 the wind will move the directional vane 34 to a position in which the front of the vane is pointing into the wind. The directional vane 34 will move the shroud 22 with it and the shroud 22 will effectively block the wind from the vane assembly 14.

If the direction of the wind changes the directional vane 34 will move and the shroud 22 will move to the new position necessary to block the wind.

The series of stop elements 52 permit a wide range of adjustment for the shroud 22 between a position of maximum efficiency and a position completely blocking the vane assembly 14 from the wind.

Although the vane assembly 14 has been described as being utilized to generate electricity, it should be apparent that it could be used as well to pump water. It would be ideal for bringing water over mountains. It could also be used to pump water for irrigation purposes. Also if such vane assemblies were mounted on ships they could be used as a source of power for moving such ships either by a direct connection to mechanical propulsion means or by conversion to electrical energy.

It is apparent that a windmill has been described including output adjustment means not heretofore provided.

It is also apparent that although I have described but one embodiment of my invention many changes and modifications can be made therein without departing from the spirit of the present invention or the scope of the appended claims.

I claim:
1. A windmill comprising:
   a vane assembly and means rotatably mounting said vane assembly about a vertical axis;
   a shroud disposed over a portion of said vane assembly and means mounting said shroud to be rotatable with respect to said vane assembly whereby said shroud can be rotated to cover different portions of said vane assembly;
   a directional vane movable by the wind to face the direction of the wind and means rotatably mounting said directional vane independently of said assembly;
   means selectively attaching said directional vane to said shroud at different positions on said shroud whereby said shroud is moved by said directional vane to a position with respect to said vane assembly depending upon the position at which said directional vane is attached to said shroud;
   said vane assembly mounting means comprising a first shaft and said directional vane mounting means comprising a second shaft, said first shaft and said second shaft being independent of each other, said first shaft being mounted in a fixed position and said second shaft being fixed to said vane to be rotatable therewith;
   said shroud mounting means including means rotatably mounting said shroud to said first shaft;
   said attaching means comprising a plurality of stop members disposed on said shroud and spaced within an arc of substantially 90° with respect to the axis of rotation of said shroud and means carried by said directional vane for selective attachment to said stop means.

2. The windmill as defined in claim 1 and including a circular track disposed above said vane assembly intermediate said vane assembly and said shroud, a wheel member mounted to said directional vane is supported by said circular track whereby said directional vane is supported by said circular track through 360° of rotational movement.

3. The windmill as defined in claim 1 and including at least one electrical generator connected with said first shaft.

4. The windmill as defined in claim 1 and including a tower and platform means carried at the top of said tower, said vane assembly rotatably mounted to said platform means and roller means carried by said shroud and engaging said platform means.

5. The windmill as defined in claim 1 and including a tower and platform means carried at the top of said tower, a track supported by said platform means and disposed intermediate said vane assembly and said shroud, and roller means carried by said directional vane and engaging said track.

6. The windmill as defined in claim 1 and in which said selective attachment means comprises a clamp member pivotally mounted to said directional vane and means for selectively pivoting said clamp member into and out of engagement with said stop members.

* * * * *

UNITED STATES PATENT AND TRADEMARK OFFICE
CERTIFICATE OF CORRECTION

PATENT NO. : 4,031,405
DATED : June 21, 1977
INVENTOR(S) : Paul Asperger

It is certified that error appears in the above-identified patent and that said Letters Patent are hereby corrected as shown below:

Col. 1, line 37, after "shroud", insert --to--.
Col. 2, line 26, after "ocean", insert --or other--;
line 37, after "toward", insert --a--.
Col. 4, lines 57 & 58, after "directional vane", delete "is supported by said circular track", insert --and rotatably engaging said circular track--.

Signed and Sealed this

Twentieth Day of September 1977

[SEAL]

Attest:

RUTH C. MASON
Attesting Officer

LUTRELLE F. PARKER
Acting Commissioner of Patents and Trademarks